UNITED STATES PATENT OFFICE 2,205,991

DIAZOTYPE PROCESS

Wilhelm Neugebauer and Oskar Süs, Wiesbaden-Biebrich, Germany, assignors to Kalle & Co. Aktiengesellschaft, Wiesbaden-Biebrich, Germany No Drawing. Application December 16, 1936, Serial No. 116,120. In Germany December 27, 1935

7 Claims. (Cl. 95—6)

The present invention relates to diazotype processes and light-sensitive layers containing diazo compounds.

In the usual diazotype processes, the development of the exposed prints is carried out by the aid of alkaline substances.

An object of the invention is a new diazotype process wherein the alkali necessary for the development is not previously existent, for example, in the form of ammonia gas or alkaline solutions. The new process is characterized in that the alkali necessary for the development is produced on the diazotype material in the moment of development by chemical conversion of several substances which individually are not capable of producing the said alkali. These substances are, in general, neutral or even acid. The said reaction takes place in the presence of water, which is applied to the material to be developed either in the form of steam or in the liquid form.

Other objects of the invention are light-sensitive papers and similar materials suitable for the performance of the described process, i. e., light-sensitive materials the layers of which contain at least one of the said compounds capable of reacting with one another in the manner described above.

The layer may consist of several individual layers and may also extend somewhat into the base. If the light sensitive material is obtained by impregnating a suitable support it is also possible that the layer is completely included in the said support. The term "layer" is therefore to be understood to comprise the whole preparation of the support employed.

Preferably the alkali according to the new process is produced by the conversion of basic metal salts by reaction with such substances as form with the cation insoluble or complex compounds, for example, basic aluminium acetate, which in itself still has an acid reaction and is in no way suitable for development, may be employed with sodium fluoride, which also does not possess any developing properties for the aforesaid conversion in the layer. In this case, during the reaction complex sodium aluminium fluoride is produced and a sodium hydroxide corresponding to the degree of basicity of the aluminium salt is set free. The said fluoride may be replaced by other alkali fluoride or other suitable substances forming complexes, for example, sodium or potassium oxalate. Also alkali salts of citric or adipic acid can be employed. The term "alkali salts" is here to be understood to comprise also ammonium compounds. Instead of the aluminium acetate other basic salts of aluminium or other metals, such as those of zinc, lead and zirconium and so forth, as also the corresponding hydroxides may be used, these being preferably present in an easily reactive if desired colloidal soluble form. For reasons of solubility and reactivity the employment of the basic salts or hydroxides in a masked form, for example in the form of slightly complex compounds may be advantageous. Thus aluminium salts in the presence of tartaric acid or other organic hydroxyl compounds which are capable of maintaining the aluminium hydroxide in solution with a neutral or basic reaction may be treated to such an extent with alkali that a neutral reaction arises. If a substance forming with aluminium more strongly complex compounds, for example a fluoride, is allowed to act on the compound thus obtained then the aluminium tartaric acid complex is broken up while alkali is set free.

For carrying out the process in practice various possibilities offer themselves. For example all the substances producing by their conversion the alkali necessary for the development may be incorporated together with the light sensitive layers, for example by rubbing in or dusting-on, if desired together with an azo component. Again the one reaction component together with the solution of the diazo compound may be applied and the other one may be powdered on afterwards. The development of the material which has been exposed to light is effected in these cases by moistening or by means of water vapour, if desired with simultaneous or subsequent heating. It is, however, also possible to proceed in such manner that only one component of the system effecting the development is incorporated with the light sensitive layer and the second component is then applied, if desired together with an azo component in one of the moist developing machines customarily used in the diazotype process after the exposure, if desired with the application of heat. As compared with the alkaline developers hitherto customary in the moist developing process the latter process has the advantage of the employment of neutrally reacting substances. As a consequence of this the developer is more stable. Furthermore no damage to the paper by excessive alkali can occur, inasmuch as the quantity of alkali arising in the conversion is determined by the second component existent in the layer. The quantity of this second component may exactly be adjusted on the production of the light-sensitive material.

The quantities of the compounds producing the necessary alkali are determined according to the nature of the light sensitive diazo compounds and azo components, and the quantities of acid and other alkali binding additions existent in the layer. The additions usual in the diazotype process, for example anti-discoloring agents, buffering substances and so forth may also be contained in the layers, provided they do not react in a disturbing manner with the compounds of the system effecting the development.

The following examples illustrate the invention:

(1) Paper is coated with a layer of 2 grams of the zinc chloride double salt of the diazo compound from 1-diethylamino-3-ethoxy-4-aminobenzene, 1 gram of boric acid and 1 gram of thiourea in 100 c. c. of water. The paper so treated is thoroughly dried and then rubbed in with a mixture consisting of 19 parts of alumina gel, 42 parts of sodium fluoride and 30 parts of phloroglucine. After the exposure to light under a pattern, the print is developed by short treatment with steam. Copies having strong violet blue tones are obtained.

Instead of the above-named diazo compound, other diazo compounds known in the diazotype process such as the sulphate of the diazo compound from 1-amino-4-phenyl-amino benzene, the tin chloride double salt of the diazo compound from 1-amino-4-N-ethyl-N-benzyl-amino benzene, the diazo compound from 1-amino-4(2',6'-dichlorbenzyl)-aminobenzene, the diazo compound from 1-amino-4-diethyl-aminobenzene as also the diazo compounds from amino-naphthol sulphonic acids may be employed. Tones ranging from red-brown to black may be obtained depending upon the diazo compound employed.

(2) A solution of 3 grams of the zinc chloride double salt of the diazo compound from 1-amino-4-benzoyl-amino-2.5-diethoxybenzene, 1.5 grams of citric acid and 1 gram of boric acid in 100 c. c. of water is coated on paper. After drying at about 60° the coated side is rubbed in with the necessary quantity of a mixture consisting of 6 grams of alumina gel, 9 grams of potassium oxalate and 5 grams of phloroglucine. After exposure to light under a pattern and development with steam, a print is obtained having red-brown tones.

(3) A paper coated according to Example 2 is rubbed in after drying with a mixture of 16 grams of basic aluminium acetate

$(AlOH(C_2H_3O_2)_2)$ 37 grams of potassium fluoride or the equivalent quantity of the ammonium compound and 16 grams of phloroglucine. After the exposure on development with steam, prints having brown-black tones are obtained.

(4) To the solution of 75 grams of sodium potassium tartrate (Seignette salt) and 160 grams of aluminium sulphate in 300 c. c. of water, 380 c. c. of a 10% sodium carbonate solution are added. To this solution which may if desired be filtered for the removal of a slight cloudiness, 20 grams of the zinc chloride double salt of the diazo compound from 1-diethylamino-3-ethoxy-4-aminobenzene and 10 grams of boric acid are added. The solution is then made up with water to 1 liter. With the solution thus obtained paper is coated and after thorough drying is rubbed in with the necessary quantity of a mixture consisting of 10 grams of sodium fluoride and 10 grams of phloroglucine. After the exposure and development with steam, prints with violet blue tones are obtained.

The development with steam may be effected by allowing saturated steam to impinge on the coated side of the paper or by moistening the backs of the prints by the aid of a coating roller and then passing them over a heated plate or roller.

The diazo compound employed in this example can also be replaced by other diazo compounds.

(5) A solution of a basic aluminium complex salt of gluconic acid is produced in the following manner:

48 grams of aluminium sulphate are dissolved together with 39 grams of gluconic acid in 250 c. c. of water. To this 200 c. c. of a 10% sodium carbonate solution are added, a slight precipitate being thereby produced. By the addition of 20% sulphuric acid the solution is brought to such a degree of acidity which corresponds with a pH-value of about 6. Meanwhile, the precipitate which has been produced goes into solution again.

50 c. c. of the solution obtained are added to a solution of 2 grams of the diazo compound of the 1-diethylamino-3-ethoxy-4-aminobenzene and .5 of a gram of boric acid in 50 c. c. of the water and paper is coated with this solution. After thorough drying, the sensitized coating is rubbed in with a mixture of equal parts of phloroglucine and sodium fluoride, the phloroglucine being employed in a quantity sufficient for the formation of the dyestuff. The development of the exposed layer is effected by means of water.

(6) 3 grams of the diazo compound of 1-benzoyl-amino-2.5-diethoxy-4-aminobenzene, 1.5 grams of citric acid, 1 gram of boric acid and 1 gram of aluminium sulphate are dissolved in 50 c. c. of water; to this 50 c. c. of a mixture which is obtained from 9.5 grams of gluconic acid, 8 grams of zirconium nitrate, 100 c. c. of water and 17 c. c. of a 10% sodium carbonate solution are added. Papers coated with the solution thus obtained are after exposure developed with a solution of 20 grams of phloroglucine and 20 grams of sodium fluoride in 1 liter of water.

(7) 3 grams of the diazo compound named in Example 6 together with the additions specified in the said example, are dissolved in 50 c. c. of water. To this solution 50 c. c. of a solution of 18.7 grams of beryllium nitrate $(Be(NO_3)_2.3H_2O)$ and 39 grams of commercial 50% gluconic acid in 150 c. c. of water which has been further treated with 95 c. c. of a 10% sodium carbonate solution are added. The development of the prints coated with this solution is effected according to Example 6.

(8) 40 grams of zirconium nitrate $(Zr(NO_3)_4)$ are dissolved in 500 c. c. of water and are treated with about 100 c. c. of a 10% soda solution so that the liquid assumes a pH-value of about 5.1. A slight jelly-like precipitation takes place which, however, does not disturb the working operations. 50 c. c. of this solution are added to a solution of 3 grams of the diazo compound of 1-benzoyl-amino-2.5-diethoxy-4-aminobenzene, 1.5 grams of citric acid, 1 gram of boric acid and 1 gram of aluminium sulphate in 50 c. c. of water and the solution obtained is coated on paper. The exposed prints are developed with a solution of 16.6 grams of potassium oxalate in 100 c. c. of water which has been brought to pH=6.3 by means of a few drops of an aqueous solution of oxalic acid and has been treated with 2 grams of phloroglucine.

(9) A solution of a basic aluminium complex salt of glycollic acid is prepared in the following manner: 67.5 grams of glycollic acid and 308 grams of aluminium sulphate are dissolved in 400 c. c. of water. To this solution a 10% sodium carbonate solution is added in such quantity that it reacts acid with litmus (about 1850 c. c. are used). By the addition of citric acid the solution is brought to a pH-value of about 5.5 to 6. 50 c. c. of the obtained solution are added to a solution of 1.5 grams of the sulphate of the diazo compound from 2.5-diethoxy-4-amino-4'-ethoxydiphenyl, 0.75 gram of tartaric acid and 1 gram of boric acid in 1 liter of water. This solution is coated on to paper. As developer a solution of 30 grams of sodium citrate, 20 grams of phloroglucine, 0.2 of a gram of citric acid (cryst.) in 1 liter of water is employed. Instead of the sodium citrate also the sodium salt of adipic acid can be used.

(10) A paper prepared according to example 9 is exposed beneath a pattern and developed with a solution of 15 grams of sodiummetaphosphate and 20 grams of phloroglucine in 1 liter of water.

We claim:

1. Light sensitive material comprising a support and a light sensitive layer which latter comprises a diazo compound, an azo component, a basic metal compound and an alkali metal salt which is capable of forming a complex salt by chemical conversion with the said basic metal compound in the presence of water under formation of the alkali necessary for the development, the said basic metal compound and the said alkali metal salt individually in the presence of water not being capable of producing the alkali necessary for the development.

2. Light sensitive material comprising a support and a light sensitive layer which latter comprises a diazo compound, an azo component, a basic aluminium compound and an alkali metal salt which is capable of forming an aluminium complex salt by chemical conversion with the said basic aluminium compound in the presence of water under formation of the alkali necessary for the development, the said alkali metal salt and the said basic aluminium compound individually in the presence of water not being capable of producing the alkali necessary for the development.

3. Light sensitive material comprising a support and a light sensitive layer which latter comprises a diazo compound, an azo component, a basic aluminium compound and an alkali salt of an organic carboxylic acid containing more than one carboxy group, the aluminium compound and the alkali salt individually in the presence of water not being capable of producing the alkali necessary for the development, but being capable of producing the alkali necessary for the development by chemical conversion with one another in the presence of water.

4. Light sensitive material comprising a support and a light sensitive layer which latter comprises a diazo compound, an azo component, a basic aluminium compound and a salt selected from the group consisting of the alkali metal salts of oxalic acid, citric acid and adipic acid, the said basic aluminium compound and the said salt individually in the presence of water not being capable of producing the alkali necessary for the development, but being capable of producing the alkali necessary for the development by chemical conversion with one another in the presence of water.

5. Light sensitive material comprising a support and a light sensitive layer which latter comprises a diazo compound, an azo component, a basic aluminium compound and an alkali metal fluoride, the said basic aluminium compound and the said alkali metal fluoride individually in the presence of water not being capable of producing the alkali necessary for the development, but being capable of producing the alkali necessary for the development by chemical conversion with one another in the presence of water.

6. Light sensitive material comprising a support and a light sensitive layer which latter comprises a diazo compound and a basic metal compound individually in the presence of water not being capable of producing the alkali necessary for the development, but being capable of forming a complex salt with an alkali metal salt in the presence of water under formation of the alkali necessary for the development, which alkali metal salt individually in the presence of water is also not capable of producing the alkali necessary for the development.

7. Light sensitive material, according to claim 6, characterised in that the basic metal compound is a basic aluminium compound.

WILHELM NEUGEBAUER.
OSKAR SÜS.